Jan. 13, 1931. E. V. JOHNSON 1,788,675
SUPPORT FOR MANUALLY OPERATED EGG BEATERS
Filed Feb. 7, 1930
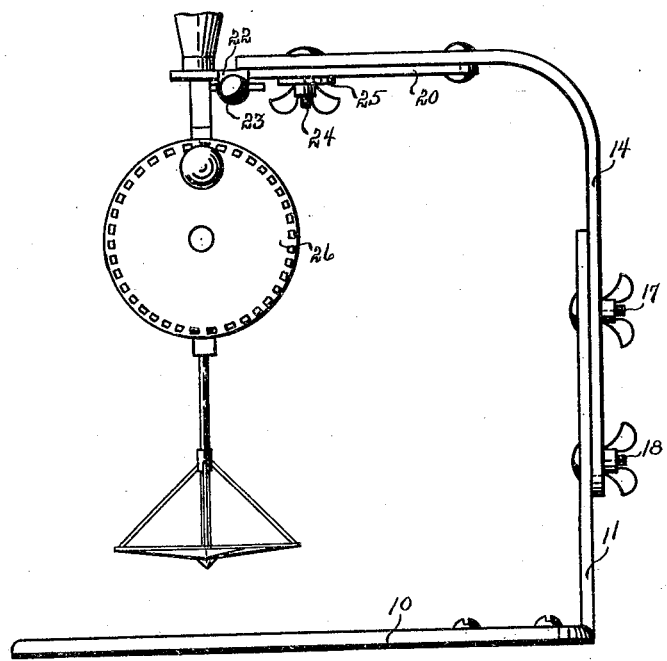
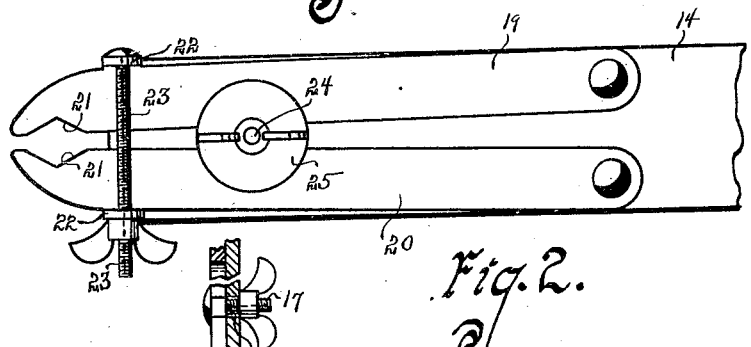
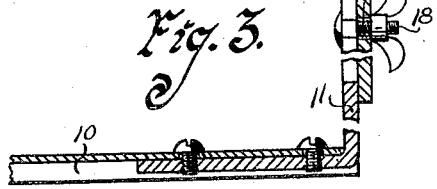
Inventor
E. V. Johnson
By M. Talbert Dick
Attorney Patented Jan. 13, 1931

1,788,675

UNITED STATES PATENT OFFICE

EDWARD V. JOHNSON, OF GOWRIE, IOWA

SUPPORT FOR MANUALLY-OPERATED EGG BEATERS

Application filed February 7, 1930. Serial No. 426,532.

The principal object of this invention is to provide a supporting device for successfully holding an egg beater or the like in a rigid condition while the same is being manually operated.

A further object of my invention is to provide a device for holding an egg beater or the like that permits the egg beater to be quickly attached on or detached from the device.

A still further object of my invention is to provide an egg beater holder that will successfully support and hold egg beaters of various sizes and types.

A still further object of my invention is to provide a support for holding egg beaters or the like that may be so adjusted as to support or hold the egg beater at various elevations inside the dish containing the material to be agitated.

A still further object of this invention is to provide a supporting holder for egg beaters or the like that is economical in manufacture and durable in use.

These and other objects will be apparent to those skilled in the art.

My invention consists in the construction, arrangement and combination of the various parts of the device, whereby the objects contemplated are attained as hereinafter more fully set forth, pointed out in my claims and illustrated in the accompanying drawings, in which:

Fig. 1, is a side view of my complete invention supporting and holding one type of an egg beater.

Fig. 2, is a bottom view of the clamping mechanism for engaging the handle portion of an egg beater and securely holding and supporting the same.

Fig. 3, is a side sectional view of a portion of my egg beater stand and more fully illustrates the manner in which the adjusting of the egg beater to various heights is accomplished.

Beaters for whipping cream, beating eggs and the like are very tedious to operate due to the fact that they must be held in one hand and operated with the other hand. I have overcome this objection by providing a stand that will rigidly hold the egg beater in the proper position inside the container having the cream or eggs to be agitated.

I have used the numeral 10 to designate the base portion of my invention. Secured to this base portion by suitable means is a flat vertically extending post 11 as shown in Fig. 1 and Fig. 3. Formed in this post are two longitudinal slots 12 and 13. The numeral 14 designates a bar bent near its center so that its two ends extend at right angles relative to each other as shown in Fig. 1. The numerals 15 and 16 designate holes in the lower end portion of the member 14 that communicate with the slots 12 and 13, respectively, when the lower end portion of the bar is adjacent the post 11 as shown in Fig. 3. The numeral 17 designates a hand bolt extending through the slot 12 and hole 15 and the numeral 18 designates a duplicate hand bolt extending through the slot 13 and the hole 16. These bolts 17 and 18 have a square portion in their lengths that engage the slots 12 and 13, respectively, as shown in Fig. 3, thereby preventing the rotation of the male portion of the bolts when the nut portions of the same are rotated. Rotatably mounted at their rear ends on the underside of the upper end of the bar member 14 are two jaw members 19 and 20. These two jaw members are pivoted some distance from the end of the bar member 14 but have their forward ends extending beyond the bar member as shown in Fig. 2. The numeral 21 designates a tapered notch formed on the inner marginal edge of each of these jaw members. These two notches are adjacent each other and are near the free ends of the two jaw members as shown in Fig. 2. Extending downwardly from each of the jaw members is an ear 22. Extending through these two ears is an elongated hand bolt 23. By this construction when the nut of the hand bolt 23 is rotated to the right the jaws 19 and 20 will be moved toward each other. By rotating this same nut to the left the jaw members 19 and 20 may have their free ends moved further away from each other. Near the upper end of the bar 14 and extending through the center of the same is a hand bolt 24 as shown in Fig. 1, and Fig. 2. This hand bolt is designed to extend downwardly between the two jaws 19 and 20 and be located between the position of the bolt 23 and the pivoted ends of the two jaws 19 and 20. The numeral 25 designates a large washer on the hand bolt 24 located between the nut of the hand bolt 24 and the two jaws 19 and 20. This washer 25 therefore engages and supports the underside of the two jaw members 19 and 20, and holds them in proper position adjacent the underside of the bar 14. By the hand bolt 24 extending between the two jaw members 19 and 20, the jaw members will be properly held and centered longitudinally with the bar 14.

To install an egg beater on my supporting and holding device it is merely necessary to loosen the hand bolt 24 and insert the handle portion of the egg beater between the jaws 19 and 20 and in the notches 21. By tightening the hand bolt 23 the jaw members will be drawn together and clamped upon the egg beater handle, thereby successfully holding the egg beater or the like. By tightening the hand bolt 24 a more rigid arrangement will be realized. To release the egg beater or the like from the invention it is merely necessary to loosen the hand bolts 24 and 23.

In order to obtain various elevations of the egg beater from the base 10 it is merely necessary to loosen the hand bolts 17 and 18 and slide the bar member 14 toward or away from the base member 10. This is accomplished by the hand bolts 17 and 18 being slidably mounted in the slots 12 and 13. When the desired height is obtained the hand bolts 17 and 18 should be tightened thereby rigidly clamping the lower end of the bar member 14 to the post 11.

Naturally many various sizes and types of egg beaters may be mounted on my device due to the fact that to accommodate them merely means that the jaws 19 and 20 will be further apart or closer together. I have used the numeral 26 to designate an egg beater being rigidly supported and held in my invention.

Some changes may be made in the construction and arrangement of my improved support for manually operated egg beaters without departing from the real spirit and purpose of my invention and it is my intention to cover by my claims any modified forms of structure or use of mechanical equivalents which may be reasonably included within their scope.

I claim:

1. In a device of the class described, a base member, a supporting member, two jaw members rotatably secured at one of their ends to said supporting member, an ear formed on each of said jaw members, and a hand bolt extending through to said ears.

2. In a device of the class described, a base member, a supporting member secured to said base member and extending above said base member, two jaw members having their rear ends rotatably secured to said supporting member, an ear formed on each of said jaw members near their free ends, a hand bolt extending through said supporting member and protruding said two jaw members, and a washer on said last mentioned hand bolt capable of overlapping and engaging said two jaw members.

3. In a device of the class described, a base member, a vertical post secured to said base member, slots formed in said post member, an L-member having its lower end portion adjacent said post, hand bolts extending through said slots and said L-member, two jaw members rotatably secured at one of their ends to said L-member, and a hand bolt operatively connected to said jaw members for holding and bringing them together.

EDWARD V. JOHNSON.